(12) United States Patent
Favero et al.

(10) Patent No.: US 10,427,731 B2
(45) Date of Patent: Oct. 1, 2019

(54) ADJUSTABLE MOUNT APPARATUS FOR USE WITH VEHICLES AND RELATED METHODS

(71) Applicant: Ford Global Technologies, LLC, Dearborn, MI (US)

(72) Inventors: Kevin Joseph Favero, Plymouth, MI (US); MIchael J. Gardynik, Farmington Hills, MI (US); Kevin A. Gustafson, South Rockwood, MI (US); Austin Murphy, Westland, MI (US); Steven Frank, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/892,014

(22) Filed: Feb. 8, 2018

(65) Prior Publication Data

US 2019/0241222 A1    Aug. 8, 2019

(51) Int. Cl.
*B62D 43/02* (2006.01)
*B62D 33/027* (2006.01)

(52) U.S. Cl.
CPC ......... *B62D 43/02* (2013.01); *B62D 33/0273* (2013.01)

(58) Field of Classification Search
CPC ...... B65D 43/02; B65D 43/00; B65D 43/002; B60R 9/06; B60R 11/00; B60R 2011/0042; B60R 2011/0085; B60R 2011/0096
USPC .......................... 224/42.21, 42.25, 42.28, 553
See application file for complete search history.

(56) References Cited

U.S. PATENT DOCUMENTS

| | | | | |
|---|---|---|---|---|
| 3,613,972 A | * | 10/1971 | Daughhetee | B62D 43/08 224/42.24 |
| 3,753,520 A | * | 8/1973 | Bodde | B62D 43/02 224/42.21 |
| 3,845,891 A | * | 11/1974 | Becher | B62D 43/002 224/42.21 |
| 3,904,093 A | * | 9/1975 | Hanela | B62D 43/04 224/42.21 |
| 4,212,417 A | | 7/1980 | Scott | |
| 4,278,191 A | * | 7/1981 | Mecham | B62D 43/002 224/42.21 |
| 4,282,994 A | * | 8/1981 | Hilliard | B62D 43/02 224/42.15 |
| 4,312,620 A | * | 1/1982 | Muschalek, Jr. | B62D 43/04 224/42.12 |
| 4,410,117 A | | 10/1983 | Crawford et al. | |
| 4,434,919 A | * | 3/1984 | Flowers | B62D 43/02 224/42.21 |
| 4,561,575 A | * | 12/1985 | Jones | B62D 43/02 224/42.21 |

(Continued)

OTHER PUBLICATIONS thesamba.com, "Burley Swing Away Tire Carrier—Install, New developments.", retrieved from https://www.thesamba.com/vw/forum/viewtopic.php?t=464865, posted May 18, 2011, 1 page.

*Primary Examiner* — Brian D Nash
(74) *Attorney, Agent, or Firm* — Vichit Chea; Hanley, Flight & Zimmerman, LLC

(57) ABSTRACT

Adjustable mount apparatus for use with vehicles and related methods are disclosed. An example apparatus includes a mount for a vehicle. The mount has a first portion to receive an object to be carried by the mount and a second portion that is pivotably coupled to the first portion. The second portion is to slidably couple to a right or left side of the vehicle.

18 Claims, 11 Drawing Sheets

(56) References Cited

U.S. PATENT DOCUMENTS

| | | | | |
|---|---|---|---|---|
| 4,573,855 A * | 3/1986 | Braswell | ................ | B62D 43/04 224/42.23 |
| 4,679,717 A * | 7/1987 | Hansen | ................ | B62D 43/02 224/42.12 |
| 4,817,834 A * | 4/1989 | Weiler | ................ | B62D 43/02 224/42.21 |
| 4,993,610 A * | 2/1991 | Abretske | ................ | B60R 11/00 224/42.13 |
| 5,020,707 A * | 6/1991 | Nozel | ................ | B62D 43/02 224/42.21 |
| 5,026,107 A * | 6/1991 | Hess | ................ | B62D 43/04 224/42.12 |
| 5,094,374 A * | 3/1992 | Lee | ................ | B62D 43/02 224/42.21 |
| 5,104,015 A * | 4/1992 | Johnson | ................ | B60R 9/06 224/401 |
| 5,186,371 A * | 2/1993 | Jozefczak | ............ | B62D 43/002 224/42.21 |
| 5,538,168 A | 7/1996 | Burger et al. | | |
| 5,791,533 A * | 8/1998 | Neag | ................ | B62D 43/02 224/282 |
| 5,806,736 A * | 9/1998 | Kincart | ................ | B62D 43/02 224/42.13 |
| 5,957,346 A | 9/1999 | Schambre et al. | | |
| 6,189,748 B1 * | 2/2001 | Hutter | ................ | B62D 43/00 224/42.21 |
| 6,659,318 B2 * | 12/2003 | Newbill | ................ | B60R 9/06 224/282 |
| 6,701,913 B1 * | 3/2004 | LeDuc | ................ | B60R 9/06 126/276 |
| 7,281,646 B2 * | 10/2007 | Flannery | ................ | B60R 9/06 126/276 |
| 7,861,902 B2 | 1/2011 | Osenkowski | | |
| 9,027,805 B1 * | 5/2015 | Prejeant | ................ | B62D 43/002 224/42.23 |
| 2002/0084298 A1 * | 7/2002 | Essig | ................ | B62D 43/02 224/509 |
| 2004/0028510 A1 * | 2/2004 | Jones | ................ | B60R 9/042 414/462 |
| 2004/0079774 A1 * | 4/2004 | Roehmer | ................ | B60R 11/06 224/42.21 |
| 2004/0079778 A1 * | 4/2004 | Wilkens | ................ | B60R 9/065 224/509 |
| 2004/0222261 A1 * | 11/2004 | Wilson | ................ | B60R 9/06 224/509 |
| 2005/0077327 A1 * | 4/2005 | Kenney | ................ | B60R 11/06 224/42.21 |
| 2006/0102666 A1 | 5/2006 | Godding | | |
| 2009/0001109 A1 * | 1/2009 | Wilkins | ................ | B60D 1/58 224/42.21 |
| 2019/0100259 A1 * | 4/2019 | Cherry | ................ | B62D 43/02 |
| 2019/0126997 A1 * | 5/2019 | Wymore | ................ | B62D 43/02 |

* cited by examiner

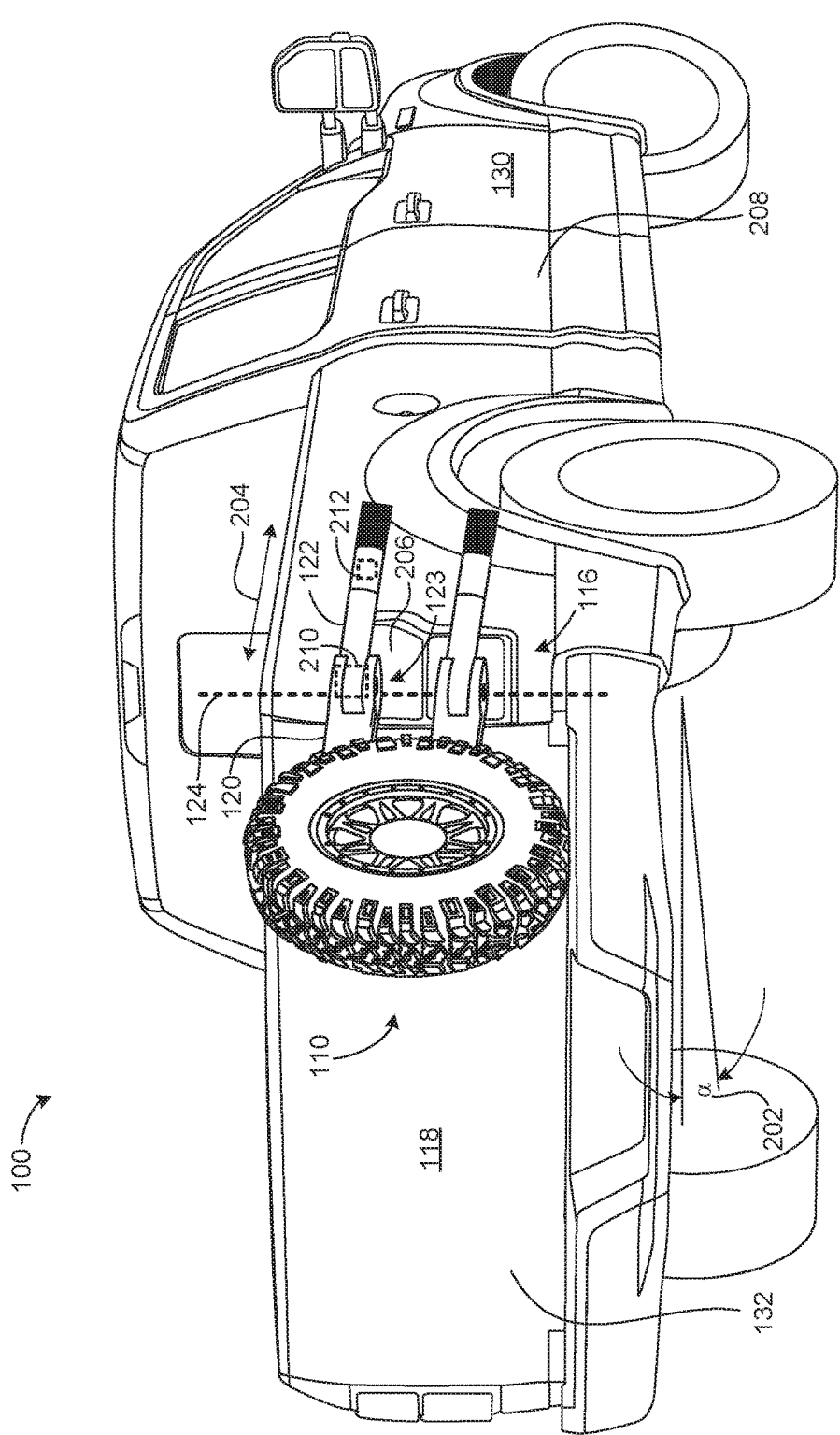

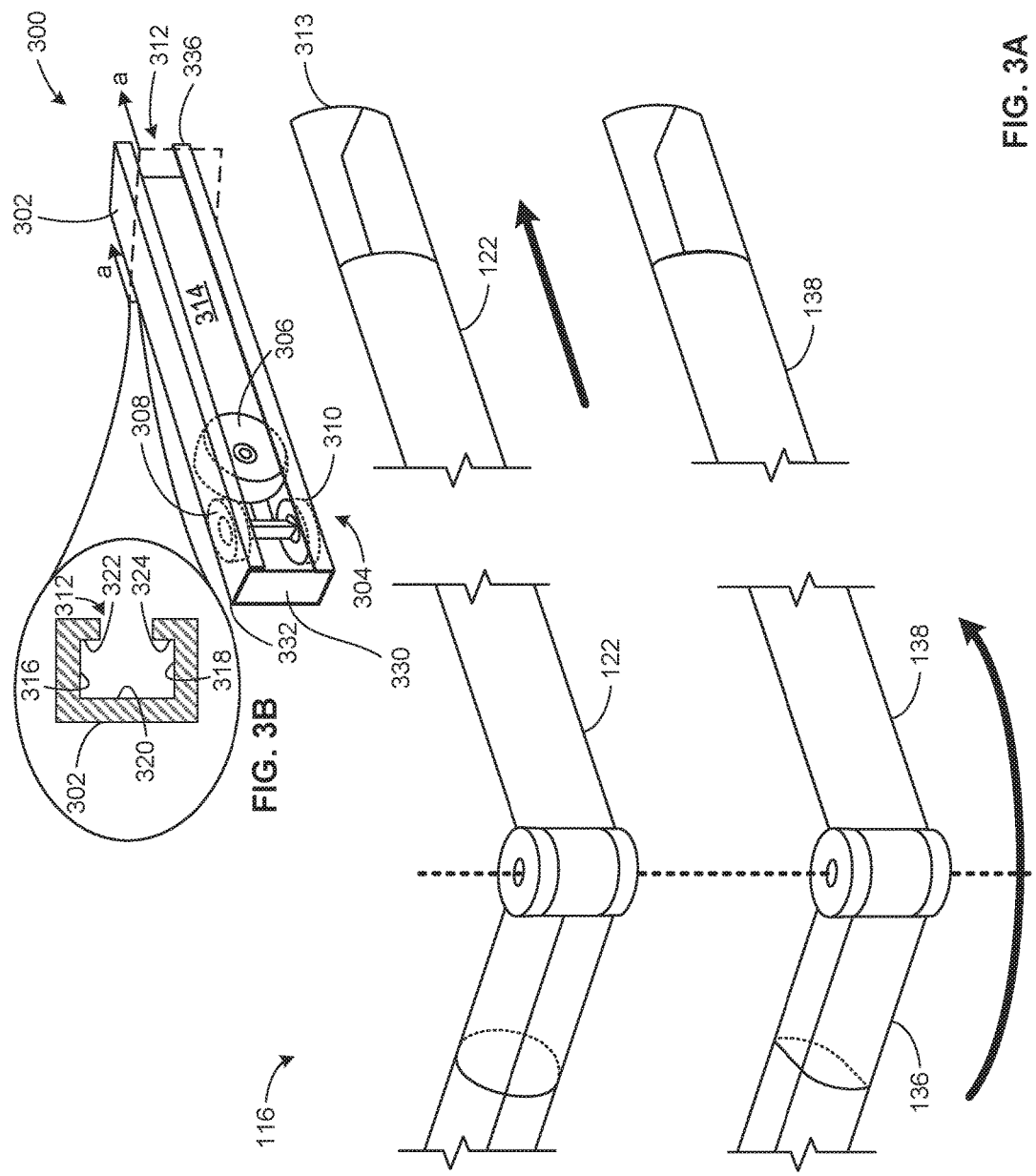

ADJUSTABLE MOUNT APPARATUS FOR USE WITH VEHICLES AND RELATED METHODS

FIELD OF THE DISCLOSURE

This disclosure relates generally vehicles and, more particularly, to adjustable mount apparatus for use with vehicles and related methods.

BACKGROUND

Some vehicles include a tire mount to carry a spare tire. The spare tire may be removably coupled to the tire mount for access by a driver, a vehicle servicer personnel, etc. In some cases, the tire mount is fixedly coupled to an exterior portion of the vehicle such as a tailgate, a liftgate, a swing gate, etc.

SUMMARY

An example apparatus includes a mount for a vehicle. The mount has a first portion to receive an object to be carried by the mount and a second portion that is pivotably coupled to the first portion. The second portion is to slidably couple to a right or left side of the vehicle.

Another example apparatus includes a vehicle and a tire mount adjustably coupled to the vehicle. A first portion of the tire mount is to receive a tire, and a second portion of the tire mount is pivotably coupled to the first portion. The second portion is to translate relative to a right or left side of the vehicle between a first position and second position.

An example method includes pivotably coupling a first portion of a tire mount to a second portion of the tire mount. The first portion is to receive a tire for a vehicle. The method also includes slidably coupling the second portion of the tire mount to a right or left side of the vehicle. The second portion is moveable between a first position and a second position relative to the vehicle.

BRIEF DESCRIPTION OF THE DRAWINGS

FIG. 2A is a view of the example vehicle of FIG. 1 and shows an adjustment of an example mount in accordance with examples disclosed herein.

FIG. 3A is a detailed view of an example guide system in accordance with examples disclosed herein.

FIG. 3B is a cross-sectional view of an example track of the example guide system of FIG. 3A taken along line a-a.

The figures are not to scale. In general, the same reference numbers will be used throughout the drawing(s) and accompanying written description to refer to the same or like parts.

DETAILED DESCRIPTION

Figure 1:
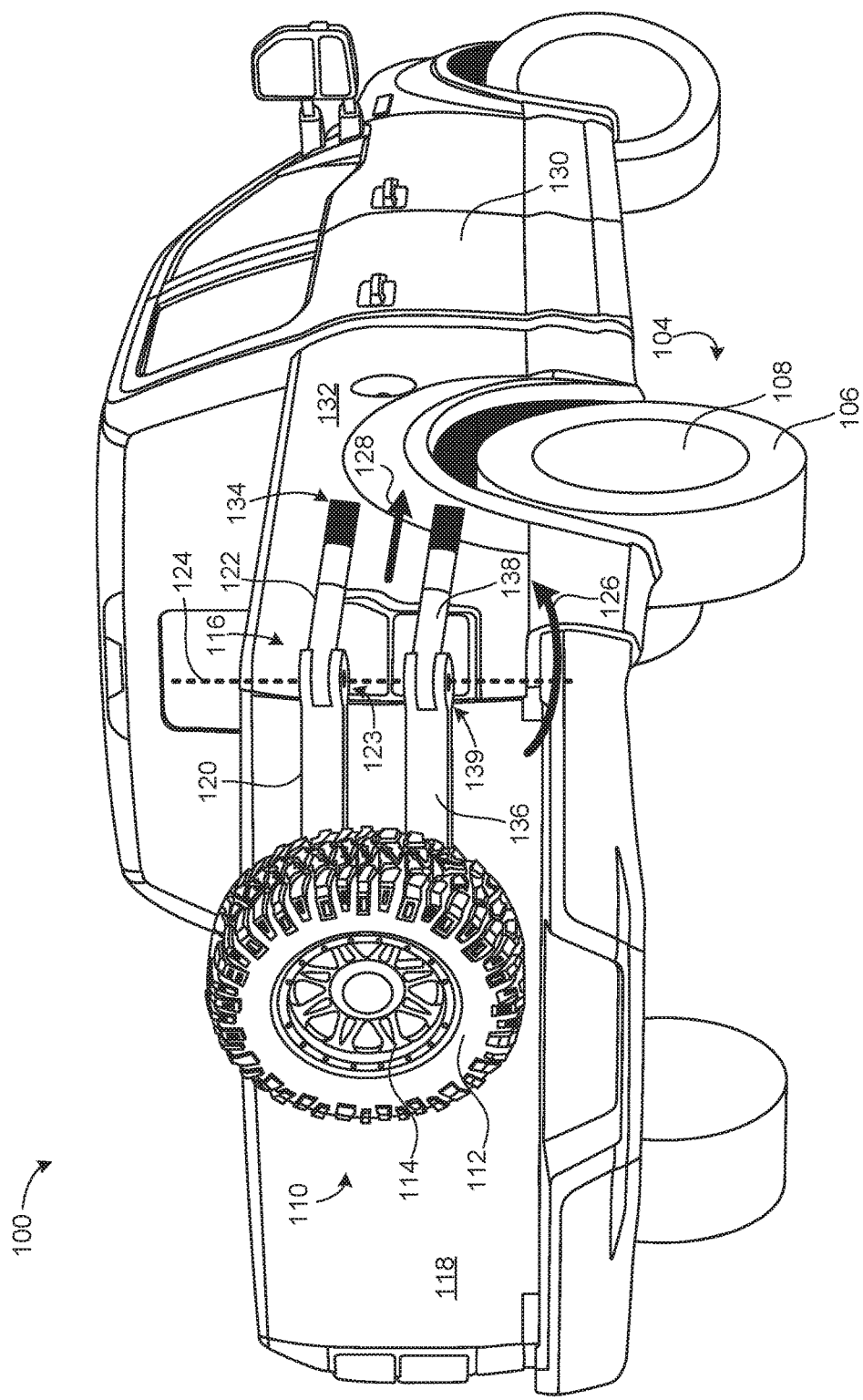
FIG. 1 is an illustration of an example vehicle in which examples disclosed herein may be implemented.

Known tire mounts may couple a spare tire to an exterior portion of a vehicle such as a tailgate, a liftgate, a swing gate, etc. However, such known tire mounts may adversely affect a vehicle gate and/or can impede access to rear compartments of the vehicle. For example, some known tire mounts and/or the spare tires thereon have a significant mass and/or weight and, as a result, impart a force on the gate, which may wear the gate and/or make operation of the gate difficult. Further, some known tire mounts may interfere with the gate and/or one or more components thereof (e.g., an adjustable window), thereby preventing the gate from functioning properly (e.g., opening and/or closing without contacting the tire mount and/or the spare tire).

Adjustable mount apparatus for use with vehicles and related methods are disclosed herein. An example adjustable mount disclosed herein includes a first portion pivotably and/or rotatably coupled to a second portion via a joint such that the first portion is moveable relative to the second portion. In particular, the first portion of the disclosed mount receives one or more vehicle parts and/or one or more vehicle accessories, such as one or more of a tire (sometimes referred to a spare tire), a wheel (e.g., coupled to the tire), a bike rack, a storage container, etc. The second portion of the disclosed mount slidably couples to a portion of a vehicle (e.g., adjacent a vehicle gate) such that the second portion moves and/or translates relative to the vehicle.

To facilitate access to a vehicle gate and/or adjust the mount, disclosed examples enable the first portion of the mount to pivot and/or move relative to the second portion between different positions. In some disclosed examples, the first portion moves from a first position that is on and/or proximate to the gate to a second position that is adjacent and/or further away from the gate relative to the first position. To further facilitate access to the gate and/or adjust the mount, disclosed examples enable the second portion of the mount to move and/or translate relative to the vehicle between different positions. In some disclosed examples, the second portion of the mount moves from a third position adjacent the gate (e.g., on a left or right side of the vehicle) to a fourth position further away from the gate relative to the third position. By slidably coupling the disclosed mount to the vehicle in this manner, forces and/or stress imparted on the vehicle by the mount are directed away from the gate, which reduces wear of the gate and/or improves functionality of the gate.

Some disclosed examples enable the first portion of the mount to pivotably and/or rotatably lock in a position relative to the second portion, which assists a user in properly positioning the first portion, the vehicle parts, and/or vehicle accessories thereon. In such examples, the disclosed mount may be implemented with an example locking system and/or an example lock, which is disclosed in greater detail below in connection with FIGS. 5-9. In particular, the disclosed locking system changes between a locked state and an unlocked state based on user input, thereby respectively locking and unlocking the portions relative to each other in one or more predefined positions. Similarly, the example lock locks and/or unlocks the portions relative to each other in one or more predefined positions based on user input to the mount.

FIG. 1 is an illustration of an example vehicle 100 in which examples disclosed herein may be implemented. The vehicle 100 of FIG. 1 may be a truck, an SUV, a van, a car, etc. In particular, the vehicle 100 includes one or more wheel assemblies rotatably coupled thereto to engage a surface (e.g., concrete, asphalt, blacktop, dirt, sand, etc.) 102 on which the vehicle 100 is positioned, four of which are shown. For example, the vehicle 100 includes a first example wheel assembly 104 rotatably coupled thereto (e.g., via a wheel hub and/or one or more fasteners). The first wheel assembly 104 of FIG. 1 includes a first tire 106 coupled to a first wheel 108 (sometimes referred to as a rim) to engage the surface 102.

In the example of FIG. 1, one or more vehicle tires and/or wheels may be decoupled from the example vehicle 100 and/or replaced (e.g., if a tire is deflated, damaged, and/or otherwise not suitable for use with the vehicle 100). In some such examples, the vehicle 100 of FIG. 1 includes a second wheel assembly 110 removably coupled thereto having a second tire 112 and a second wheel 114, which may be referred to as a spare or a spare tire. In the illustrated example of FIG. 1, the second wheel assembly 110 may be similar (e.g., the same or identical) or different relative to the first wheel assembly 104. In some examples, the second wheel assembly 110 decouples from the vehicle 100 and rotatably couples to the vehicle 100 via a tool, such as wrench (e.g., a lug wrench). For example, the second wheel assembly 110 may replace the first wheel assembly 104 (and/or a different wheel assembly of the vehicle 100).

To move and/or adjust the second wheel assembly 110, the vehicle 100 of FIG. 1 is implemented with an example first adjustable mount 116 in accordance with disclosed examples. In particular, the first mount 116 of FIG. 1 is operatively coupled between the vehicle 100 and the second wheel assembly 110 to enable the second wheel assembly 110 to move (e.g., via user input) between different positions relative to the vehicle 100. As shown in the example of FIG. 1, the second wheel assembly 110 is positioned on or proximate to (e.g., spaced by a distance less than about 12 inches) a gate 118 of the vehicle 100 in a first position, which may be undesirable for a driver, a passenger, a vehicle servicer personnel, etc. opening and/or closing the gate 118 and/or may prevent access thereto. While FIG. 1 depicts the gate 118 as being a tailgate, in other examples, the vehicle 100 may be implemented with a different gate, such as a liftgate, a swing gate, etc.

Additionally or alternatively, in some examples, the first mount 116 of FIG. 1 may be advantageously used with one or more other vehicle parts and/or accessories. For example, the first mount 116 receives and/or couples to (e.g., removably couples to) one or more of a vehicle bike rack, a vehicle storage container, etc.

According to the illustrated example of FIG. 1, the first mount 116 includes a first portion 120 pivotably and/or rotatably coupled to a second portion 122 via a first joint 123 (e.g., a kingpin, a ball joint, etc.). That is, the first portion 120 and the second portion 122 of the first mount 116 rotate and/or pivot relative to each other about an axis 124 provided by the first joint 123. In particular, the first portion 120 of FIG. 1 carries the second wheel assembly 110 away from the gate 118 from the first position to one or more different positions. For example, the first portion 120 as well as the second wheel assembly 110 rotate and/or move in a first direction 126. As such, at least a portion of the second wheel assembly 110 (e.g., the second wheel 114) is removably coupled to the first portion 120 via one or more fasteners (e.g., a pin, a bolt, etc.), which is disclosed in greater detail below in connection with FIG. 4.

To further move and/or adjust the second wheel assembly 110, the second portion 122 of the example first mount 116 is slidably coupled to the vehicle 100. In particular, the second portion 122 moves and/or translates relative to the vehicle 100 in a second direction 128 between different positions, thereby positioning the second wheel assembly 110 further away from the gate 118 (e.g., while maintaining an orientation of the second wheel assembly 110). While FIG. 1 depicts the second portion 122 of the first mount 116 as being positioned on a side (e.g., a left or right side) 130 of the vehicle 100, in other examples, the example first mount 116 may be positioned differently relative to the vehicle 100. For example, the second portion 122 may be disposed on a roof and/or an undercarriage of the vehicle 100.

In some examples, the second portion 122 of the first mount 116 is at least partially positioned behind an exterior surface 132 of the vehicle 100. For example, as shown in FIG. 1, the second portion 122 of FIG. 1 extends and/or passes into a first recessed area 134 disposed on and/or formed by the exterior surface 132.

According to the illustrated example, each of the first portion 120 and/or the second portion 122 may be implemented using one or more components such that the second wheel assembly 110 is properly supported and/or the first mount 116 has sufficient strength and/or rigidity. In the example of FIG. 1, the first portion 120 is a single arm extending away from the first joint 123 to receive the second wheel assembly 110 at an end of the arm. Similarly, in this example, the second portion 122 is a single arm extending away from the first joint 123 toward and/or into the first recessed area 134.

In some examples, the example first mount 116 of the illustrated example includes a third portion (e.g., similar or different relative to the first portion 120) 136 pivotably and/or rotatably coupled to a fourth portion (e.g., similar or different relative to the second portion 122) 138 via a second joint (e.g., a kingpin, a ball joint, etc.) 139. In such examples, the third portion 136 is removably coupled to the second wheel assembly 110 (and/or one or more other vehicle parts or accessories) and the fourth portion 138 is slidably coupled to the vehicle 100. While example of FIG. 1 depicts the first mount 116 as having the four portions 120, 122, 136, 138, in other examples, the first mount 116 may be implemented with fewer (e.g., only the first portion 120 and the second portion 122) or additional portions, as previously disclosed. Further, while aspects are disclosed in connection with the first portion 120 and the second portion 122 of the first mount 116, in other examples, such aspects may likewise apply to the third portion 136 and the fourth portion 138.

FIG. 2A is a view of the vehicle 100 of FIG. 1 and shows an adjustment of the example first mount 116. Unlike the example of FIG. 1, which depicts the first portion 120 of the first mount 116 as being in the first position on and/or proximate to the gate 118, the example of FIG. 2A depicts the first portion 120 in a second position further away from the gate 118 relative to the first position.

According to the illustrated example, the first portion 120 of the first mount 116 is adjustable between the first position and the second position (e.g., via user input). In particular, the first portion 120 pivots and/or rotates relative to the axis 124 through an angle (e.g., about 90 degrees or more) 202, which is about 90 degrees in this example. More particularly, the example second position provides that the first portion 120 and/or the second wheel assembly 110 are clear of and/or sufficiently spaced from the gate 118 such that the gate 118 and/or the exterior surface 132 of the vehicle 100 do not interfere therewith. In this manner, the first portion 120 and/or the one or more vehicle parts and/or accessories positioned thereon do not interfere with the gate 118 and/or engage the exterior surface 132 of the vehicle 100.

According to the illustrated example, the second portion 122 of the first mount 116 is adjustable between a third position (shown in FIG. 2A) and a fourth position. For example, the second portion 122 moves a distance (e.g., 2 inches, 6 inches, 12 inches, 24 inches, etc.) 204 along the first side 130 of the vehicle 100. In the example of FIG. 2A, the third position of the second portion 122 is adjacent the gate 118 and/or a taillight 206 of the vehicle 100, and the fourth position of the second portion 122 is adjacent a door (e.g., a rear side door) 208 of the vehicle 100 and/or further away from the gate 118 compared to the third position.

In some examples, the example first mount 116 of FIG. 2A includes means for locking the first portion 120 relative to the second portion 122 such that the portions 120, 122 cannot pivot and/or rotate relative to each other about the axis 124 when locked, which is disclosed in further detail below in connection with FIGS. 4-10. In such examples, the first portion 120 is enabled to lock (e.g., via user input) in the first position, the second position, and/or one or more other positions, which assists a driver, a passenger, a vehicle servicer personnel, etc. in properly positioning the first portion 120.

In some examples, to further facilitate adjusting the first mount 116 and/or positioning the second wheel assembly 110, the mount 116 is implemented with one or more motors (e.g., electric motors). For example, a first example motor 210 is operatively interposed between the first portion 120 and the second portion 122 to control movement therebetween. Similarly, in some examples, a second example motor 212 is operatively interposed between the second portion 122 and the vehicle 100 to control movement therebetween. In such example, the motor(s) 210, 212 can automatically adjust the portion(s) 120, 122 between the aforementioned positions. For example, the first motor 210 moves the first portion 120 from the first position to the second position, and the second motor 212 moves the second portion 122 from the third position to the fourth position (e.g., after the first motor adjusts the first portion 120). In such examples, a user may activate the motor(s) 210, 212, for example, by providing input to a switch communicatively coupled to the motor(s). The example motors 210, 212 of FIG. 2A may be disposed in (e.g., disposed in the first example joint 123) and/or external to the first example mount 116.

Figure 2B:
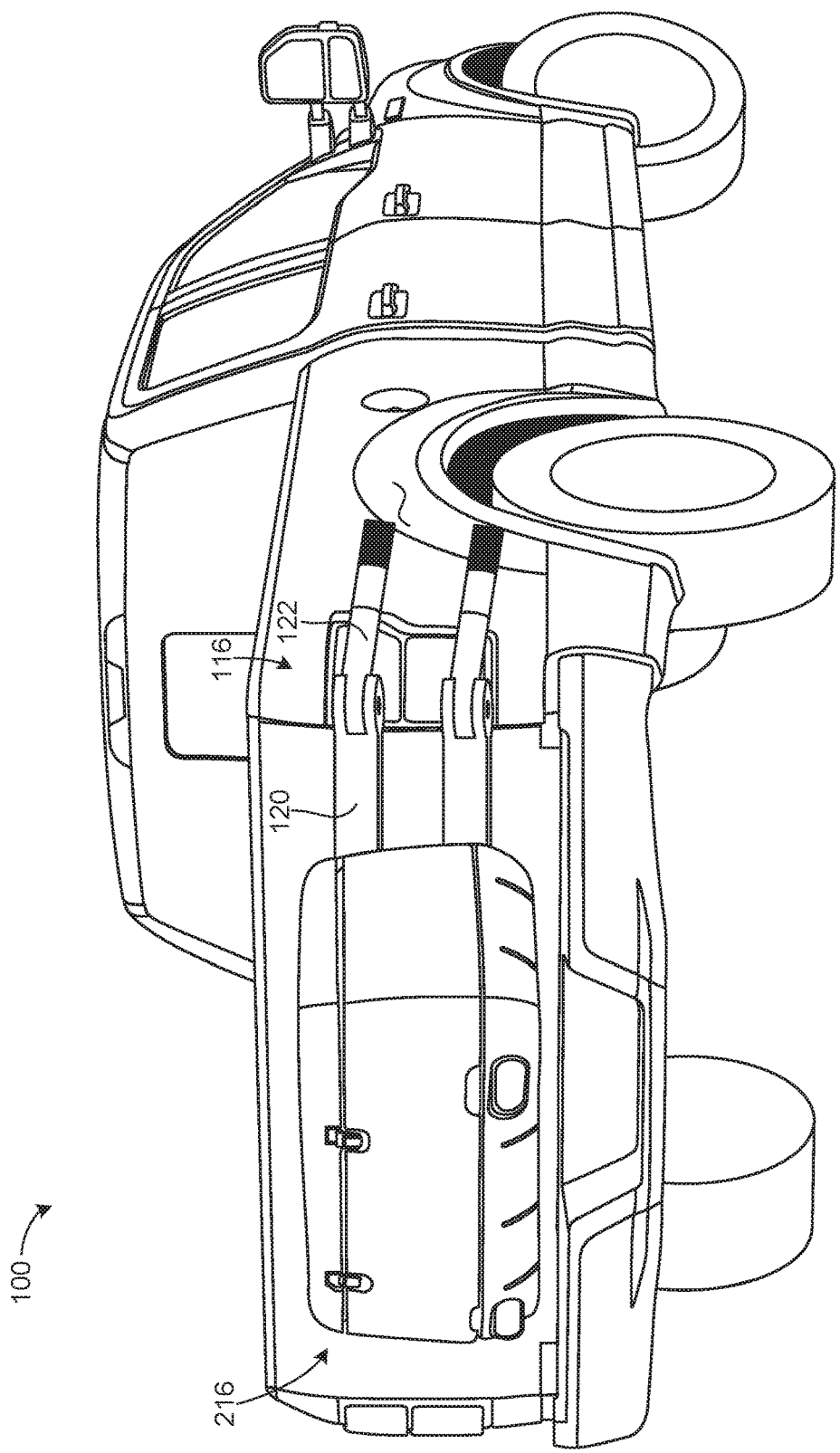
FIG. 2B is a view of the example vehicle of FIG. 1 and shows an example vehicle accessory.

FIG. 2B is another view of the vehicle 100 of FIG. 1. In particular, unlike the example of FIG. 2A, the example of FIG. 2B depicts the example mount 116 as adjustably coupling a vehicle storage container (e.g., a cooler) 216 to the vehicle 100. In other examples, as previously mentioned, the example mount 116 can carry one or more other vehicle accessories such as a bike rack. As shown in FIG. 2B, at least the first example portion 120 is removable coupled to the example storage container 216.

FIG. 3A is a detailed view of an example guide system 300 in accordance with examples disclosed herein. The guide system 300 of the illustrated example may be implemented with the example vehicle 100 and/or the example first mount 116 shown in FIGS. 1 and 2. In particular, the guide system 300 of FIG. 3A facilitates and/or guides movement of the second portion 122 of the first mount 116 relative to the vehicle 100 (e.g., between the aforementioned third position and fourth position of the second portion 122).

The guide system 300 of the illustrated example includes an example track 302 associated with the second portion 122 of the first mount 116. In particular, the track 302 of FIG. 3A defines path (e.g., a substantially linear or straight path) and guides the second portion 122 along the path as the second portion 122 moves.

According to the illustrated example, the track 302 is to be coupled to the vehicle 100 to provide support to the first mount 116. In some examples, the example track 302 is positioned on and/or behind the exterior surface 132 of the vehicle 100 (e.g., such that at least a portion of the track 302 is not visible). For example, the track 302 may be disposed in the aforementioned first recessed area 134 of the vehicle 100.

To slidably couple the first mount 116 to the vehicle 100, the example guide system 300 includes an example roller assembly 304 (sometimes referred to as a roller hinge). The roller assembly 304 of the illustrated example includes one or more rollers 306, 308, 310 positioned in the track 302, three of which are shown (i.e., a first roller 306, a second roller 308, and a third roller 310). In particular, the roller assembly 304 receives and supports the second portion 122 of the first mount 116 via an opening (e.g., a slot) 312 disposed on and/or formed by the track 302. While the example of FIG. 3A depicts the opening 312 as extending the entire length of the track 302, in other examples, the opening 312 extends along one or more portions of the length of the track 302. In the example of FIG. 3, an end 313 of the second portion 122 extends into the opening 312 and rotatably couples to one or more of the first roller 306, the second roller 308, and/or the third roller 310, for example, via one or more bearings (not shown). In other examples, one or more intermediate components are coupled between the roller assembly 304 and the second portion 122.

According to the illustrated example, the rollers 306, 308, 310 engage an inner surface 314 of the track 302, thereby maintaining an orientation of the first mount 116. For example, as shown in FIG. 3B, which is a cross-sectional view of the track 302 of FIG. 3A take along line a-a, the first roller 306 engages a first or uppermost (in the orientation of FIG. 3B) wall 316 and/or a second or lowermost (in the orientation of FIG. 3B) wall 318 of the track 302 opposite the first wall 316, which substantially prevents vertical movement of the first mount 116 in this example. Further, in the example of FIGS. 3A and 3B, the second roller 308 engages a third or leftmost (in the orientation of FIG. 3B) wall 320 and/or a fourth or rightmost (in the orientation of FIG. 3B) wall 322 of the track 302 opposite the third wall 320, which substantially prevents horizontal movement of the first mount 116. Further still, similar to the second example roller 308, the third roller 310 of the illustrated example engages the fourth wall 322 and/or a fifth or rightmost (in the orientation of FIG. 3B) wall 324 of the track 302 opposite the third wall 320, which may increase stability of the roller assembly 304.

As shown in the example of FIG. 3B, the track 302 has a c-shaped cross-section. In particular, the cross-sectional shape of the track 302 is collectively formed by the example walls 316, 318, 320, 322, 324. In some examples, the walls 316, 318, 320, 322, 324 of the illustrated example have a particular orientation relative to each other, which can facilitate movement and/or better maintain an orientation of the example roller assembly 304 relative to the track 302. In the example of FIG. 3B, the first wall 316 and the second wall 318 are substantially parallel relative to each other.

Similarly, the third wall 320, the fourth wall 322, and/or the fifth wall 324 are substantially parallel relative to each other. Further, in this example, the first wall 316 and the second wall 318 are substantially perpendicular relative to the third wall 320, the fourth wall 322, and the fifth wall 324.

In some examples, to limit movement of the roller assembly 304 in the track 302, the example track 302 includes one or more travel stops positioned thereon. For example, at least a first travel stop (e.g., a bumper) 330 is disposed at a first end 332 of the track 302 to engage at least a portion (e.g., the third roller 310) of the roller assembly 304, thereby defining the aforementioned third position of the second portion 122 of the first mount 116. In some examples, at least a portion (e.g., the first roller 306 and/or the second roller 308) of the roller assembly 304 engages a second end 336 of the track 302 and/or a portion of the vehicle 100 proximate the second end 336, thereby defining the aforementioned fourth position of the second portion 122 of the first mount 116. In this manner, the guide system 300 of the illustrated example limits movement of the first mount 116 via the track 302.

Further, while the example of FIG. 3A depicts the guide system 300 as having the single track 302 and roller assembly 304 associated with the second portion 122 of the first mount 116, in other examples, the guide system 300 may be implemented with one or more additional tracks (e.g., similar or different relative to the track 302 shown in FIGS. 3A and 3B) and/or one or more additional roller assemblies (e.g., similar or different relative to the roller assembly 304 shown in FIG. 3A). In particular, in examples where the first mount 116 is implemented with the third portion 136 and the fourth portion 138, as shown in FIG. 3A, the example guide system 300 includes another track and another roller assembly associated with the fourth portion 138 to guide and/or limit movement thereof.

Figure 4:
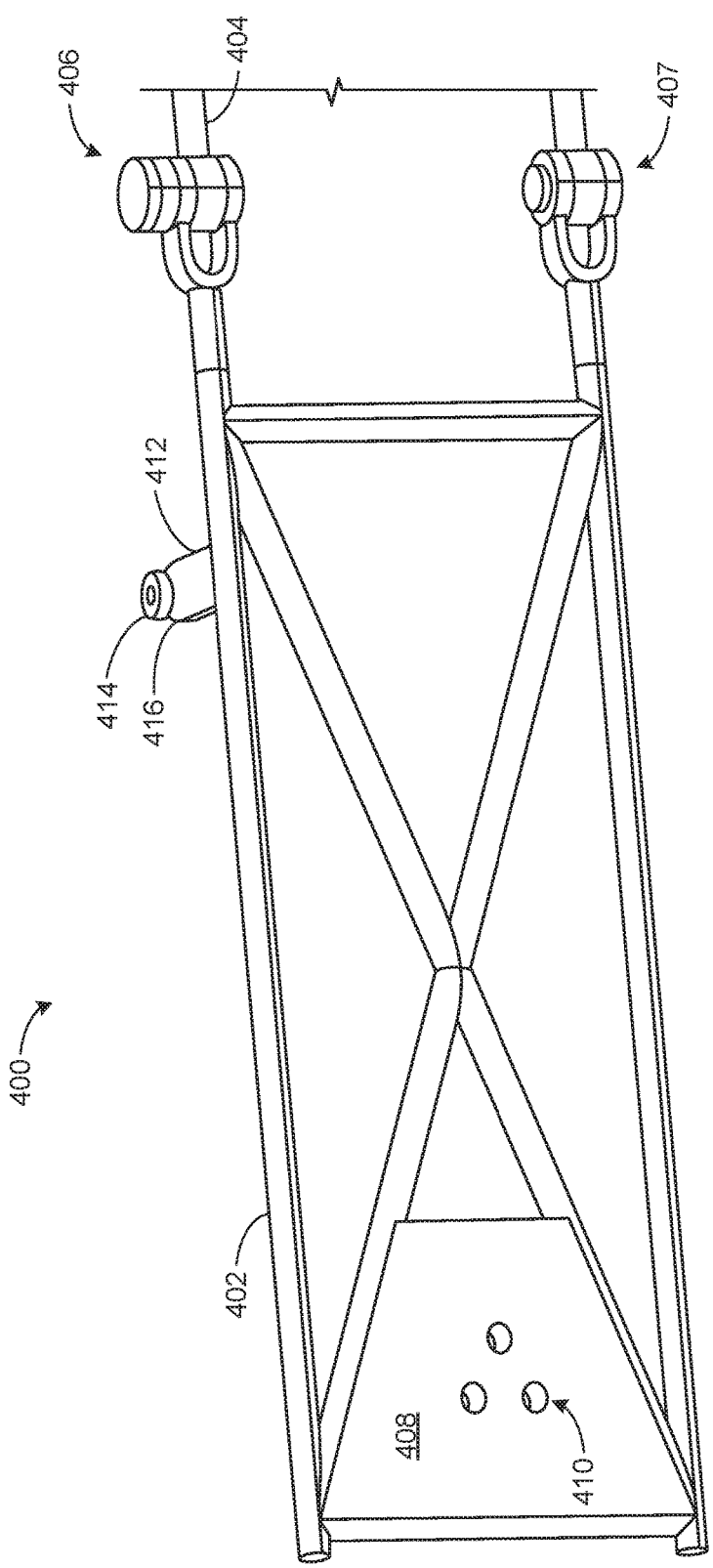
FIG. 4 is a view of another example mount in accordance with examples disclosed herein.

FIG. 4 is a view of a second example adjustable mount 400 in accordance with examples disclosed herein. The second mount 400 of the illustrated example may correspond to the first example mount 116 shown in FIGS. 1-3. In particular, the example second mount 400 includes a first portion 402 pivotably and/or rotatably coupled to a second portion 404 via a third example joint (e.g., a kingpin, a ball joint, etc.) 406 and a fourth example joint (e.g., a kingpin, a ball joint, etc.) 407. According to the illustrated example, the first portion 402 is to receive the aforementioned second wheel assembly 110 (and/or one or more other vehicle parts and/or vehicle accessories), and the second portion 404 is to slidably couple to the aforementioned vehicle 100.

To couple (e.g., removably couple) one or more vehicle parts and/or accessories to the second mount 400, the first portion 402 of FIG. 4 includes an example plate 408. In particular, the plate 408 of FIG. 4 is sized, shaped, and/or configured to receive one or more of the second wheel assembly 110, the example storage container 216, a bike rack, etc. In some examples, the plate 408 of the illustrated example includes one or more apertures, three of which are shown. For example, at least a first aperture 410 enables the second wheel assembly 110 to removably couple to the plate 408, for example, via one or more fasteners (e.g., one or more pins, bolts, nuts, etc.).

According to the illustrated example, the second mount 400 includes an example extension 412 disposed on the first portion 402. In particular, the extension 412 of FIG. 4 maintains the plate 408 spaced from exterior surface 132 of the vehicle 100 when the second mount 400 is adjusted, which may prevent damage (e.g., scratches, dents, punctures, etc.) to the exterior surface 132 by the first portion 402 and/or the second wheel assembly 110. In some examples, the extension 412 includes a roller 414 rotatably coupled to an end 416 thereof, for example, via a bearing. In such examples, the roller 414 engages the exterior surface 132 of the vehicle 100 to cause the first portion 402 of the second mount 400 to pivot and/or rotate relative to the second portion 404 via the joints 406, 407 (e.g., when the second portion 404 slides relative to the vehicle 100). In some examples, to further reduce and/or prevent damage of the exterior surface 132, the example roller 414 may be constructed of one or more soft and/or elastic materials.

Figure 5:
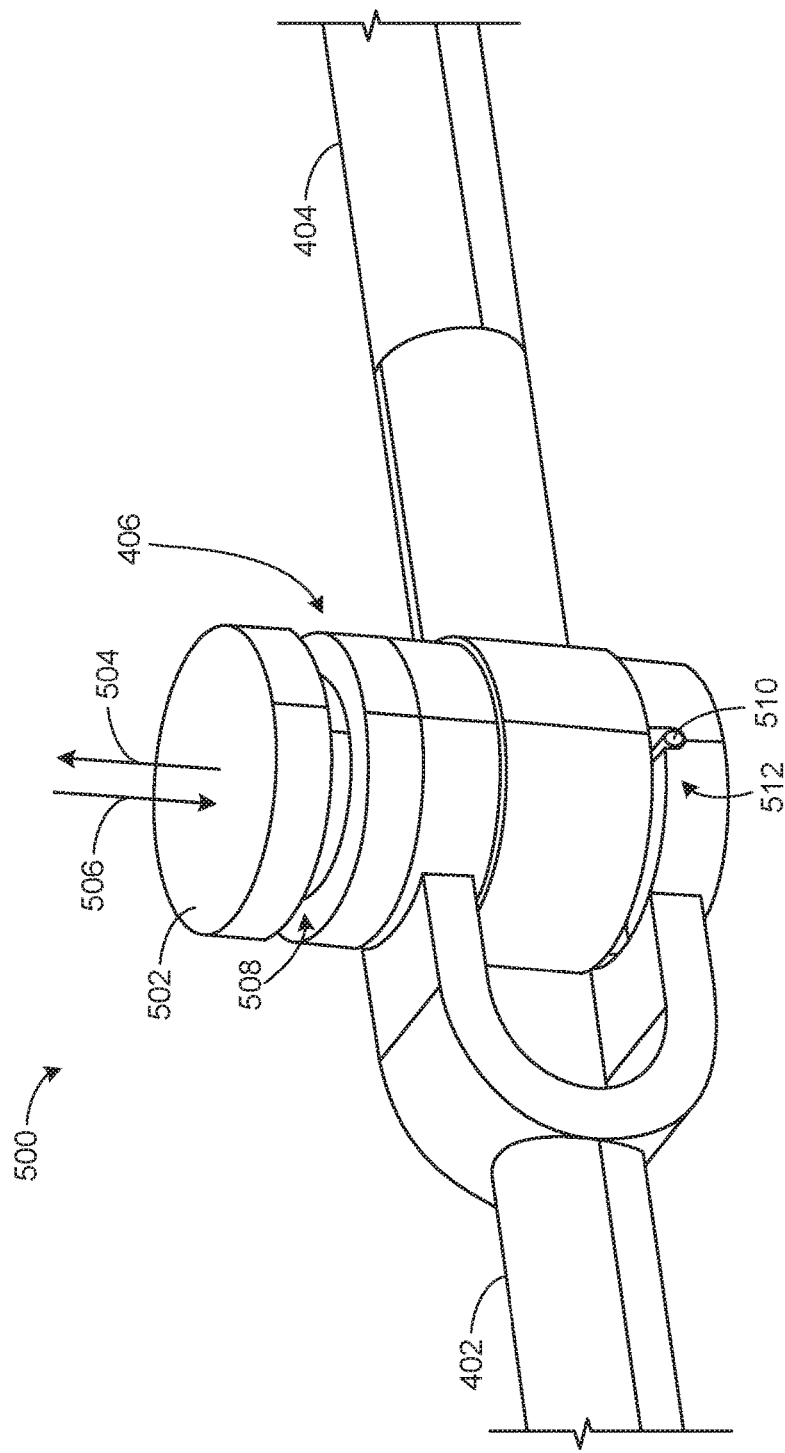
FIG. 5 is a detailed view of an example joint of the example mount of FIG. 4 showing an example locking system in accordance with examples disclosed herein.

FIG. 5 is a detailed view of the third example joint 406 of FIG. 4 showing an example locking system 500 in accordance with examples disclosed herein. According to the illustrated example, the locking system 500 is operationally interposed between the first portion 402 and the second portion 404. In particular, the locking system 500 enables the first portion 402 to pivotably and/or rotatably lock and/or unlock relative to the second portion 404 (e.g., based on user input to the third joint 406) in one or more predefined positions. While FIG. 5 depicts the locking system 500 as being implemented in the third joint 406, in other examples, the locking system 500 may be implemented in one or more of the first joint 123 shown in FIGS. 1-3, the second joint 139 of FIGS. 1-3, and/or the fourth joint 407 of FIG. 4.

To change between an unlocked state and a locked state, the locking system 500 of FIG. 5 includes an example adjustable cap 502, which will be discussed in greater detail below in connection with FIG. 6. In particular, when the cap 502 is moved (e.g., via user input) in a third direction 504 away from the portions 402, 404 toward an unlocked position, the locking system 500 changes to the unlocked state to enable the first portion 402 to pivotably and/or rotatably move relative to the second portion 404. Conversely, when the cap 502 is moved (e.g., via user input and/or a biasing force) in a fourth direction 506, opposite the third direction 504, toward a locked position, the locking system 500 changes to the locked state to prevent the first portion 402 from pivotably and/or rotatably moving relative to the second portion 404. In some examples, the cap 502 includes an example groove (e.g., an annular groove) 508 disposed thereon, which facilitates gripping of the cap 502 by a user.

In some examples, to visually indicate a predefined position and/or a state (e.g., the locked state and/or the unlocked state) of the locking system 500, the locking system 500 includes an example first lock (e.g., a pin) 510, which will be discussed in greater detail below in connection with FIGS. 6 and 7. In particular, the first lock 510 of the illustrated example is exposed via a second recessed area 512 of the third joint 406 to enable a user to identify the predefined position and/or the state of the locking system 500.

Figure 6:
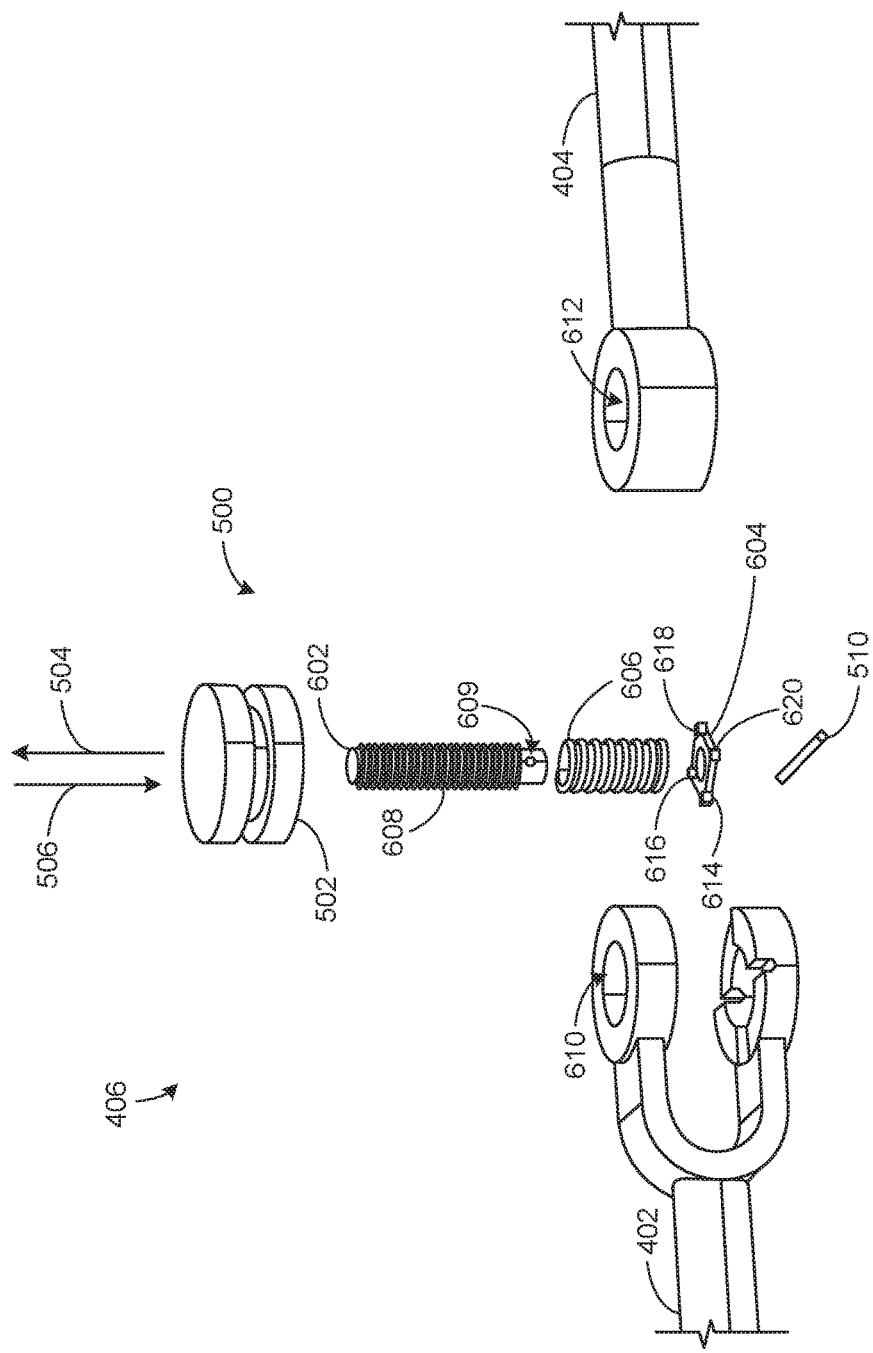
FIG. 6 is an exploded view of the example joint and the example locking system of FIG. 5.

FIG. 6 is an exploded view of the example third joint 406 and the example locking system 500 of FIG. 5. According to the illustrated example, the locking system 500 includes the example cap 502, the example first lock 510, an example pin 602, an example second lock 604, and an example spring (e.g., a coil spring, one or more Belleville washers, etc.) 606.

The example pin 602 of FIG. 6 is to receive the cap 502, the first lock 510, the second lock 604, and the spring 606. First, in some examples, the pin 602 receives the spring 606 and the second lock 604. In particular, the pin 602 fixedly couples to the second lock 604, for example, via threads 608 disposed on the pin 602. Next, in some examples, the pin 602 threadably couples to the cap 502 via the threads 608 and receives the first lock 510. In some such examples, the pin 602 includes a second aperture 609 extending at least partially therethrough to receive and/or fixedly couple to the first lock 510. While the example of FIG. 6 depicts the pin 602 as having the example threads 608, in other examples, the pin 602 may couple (e.g., fixedly couple) to the cap 502 and/or the second lock 604 via one or more other fasteners and/or fastening methods or techniques such as, for example, via an adhesive, a weld, etc.

According to the illustrated example, the pin 602 of FIG. 6 is to extend into a third aperture 610 of the first portion 402 of the second mount 400 and a fourth aperture 612 of the second portion 404, thereby pivotably and/or rotatably coupling the portions 402, 404 together. In some examples, the pin 602 is moveable (e.g., in the third direction 504 and/or the fourth direction 506) in the apertures 610, 612 (e.g., as a result of user input to the cap 502), which enables the locking system 500 to change between the locked state and the unlocked state. For example, to lock and/or unlock the portions 402, 404 relative to each other, the first lock 510 engages the first portion 402 when the second lock 604 engages the second portion 404, as will be disclosed in greater detail below in connection with FIGS. 7 and 8. In such examples, the second lock 604 of FIG. 6 includes one or more example protrusions 614, 616, 618, 620 (four of which are shown in this example) extending radially away therefrom to engage the second portion 404 in the fourth aperture 612.

In some examples, when the locking system 500 is in the unlocked state, the spring 606 urges and/or imparts a biasing force on the second lock 604 in the fourth direction 506, thereby providing the locked state of the locking system 500 (e.g., without user input). In such examples, the spring 606 may be coupled between the first portion 404 and the second lock 604 such that the spring 606 compresses when the locking system 500 is in the unlocked state and/or the cap 502 moves in the third direction 504, which is discussed further below in connection with FIG. 9.

Figure 7:
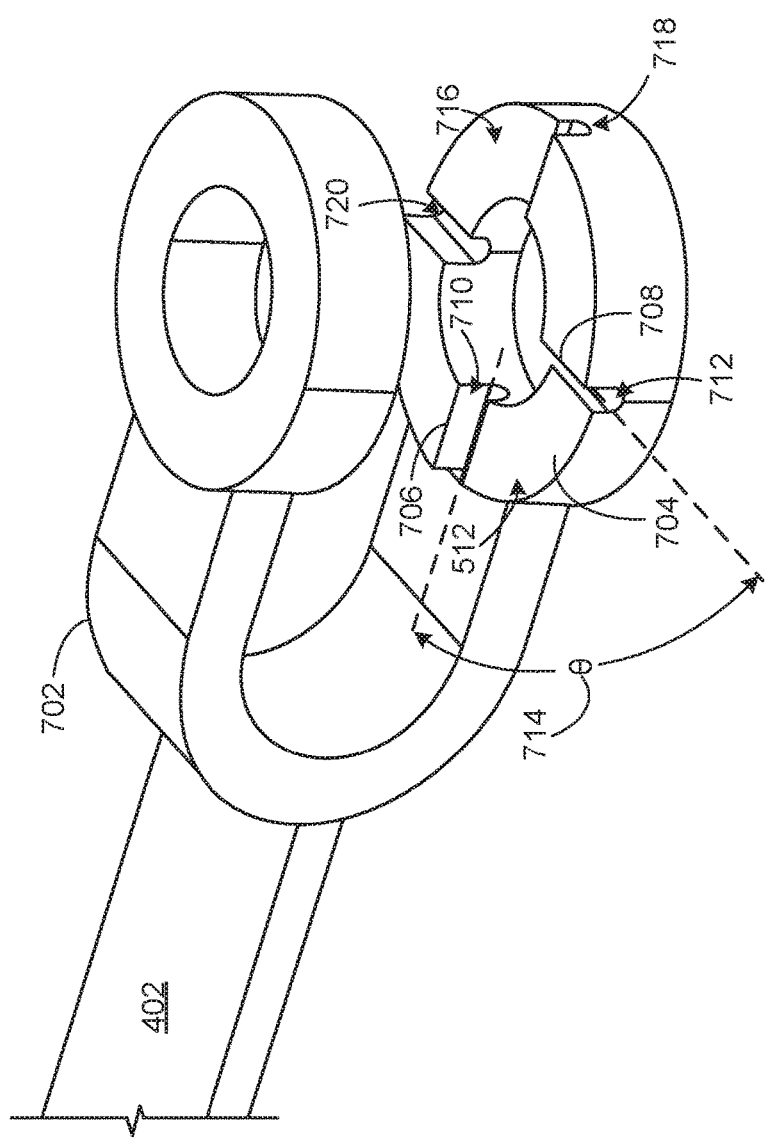
FIGS. 7 and 8 are detailed portion-views of the example mount of FIG. 4.

FIG. 7 is a detailed view of the example first portion 402 of the second mount 400. In the example of FIG. 7, the first portion 402 includes a clevis 702 to at least partially form the example third joint 406 with the second portion 404 of the second mount 400. The clevis 702 of the illustrated example includes the aforementioned second recessed area 512 to receive and/or retain the first lock 510.

According to the illustrated example, the second recessed area 512 defines a surface 704 to receive the first lock 510 when the locking system 500 is in the unlocked state such that the first lock 510 can move between ends 706, 708 of the second recessed area 512. In some examples, the first lock 510 engages the surface 704 to keep the cap 502 in the unlocked position and/or the second lock 604 disengaged from the second portion 404, thereby maintaining the unlocked state of the locking system 500. As such, the first lock 510 may slide on the surface 704 when the locking system 500 is in the unlocked state.

To limit movement of and/or retain the first lock 510, the second recessed area 512 includes one or more grooves 710, 712 to receive the first lock 510, two of which are shown in this example. In particular, the spring 606 urges the first lock 510 (e.g., via imparting a force on the second lock 604) into one or more of the grooves 710, 712 when the first lock 510 aligns thereto. In such examples, the first portion 402 is pivotably and/or rotatably locked with the pin 602 when the first lock 510 is positioned in a groove 710, 712. Conversely, the first portion 402 pivotably and/or rotatably unlocks from the pin 602 when the first lock 510 is not positioned in a groove 710, 712.

According to the illustrated example, the grooves 710, 712 are radially spaced by one or more predefined angles corresponding to the one or more predefined positions of the locking system 500 and/or the first portion 402 relative to the second portion 404. In the example of FIG. 7, the grooves 710, 712 form an angle 714 therebetween, which is about 90 degrees in this example. In other examples, the angle 714 may be larger or smaller than 90 degrees. While the example of FIG. 7 depicts the example second recessed area 512 as having only two grooves 710, 712, in other examples, the second recessed area 512 may be implemented with one or more additional grooves.

In some examples, the example clevis 702 includes a third recessed area 716, as shown in FIG. 7. The third recessed area 716 of FIG. 7 may be similar or different relative to the second recessed area 512. In the example of FIG. 7, the third recessed area 716 is positioned opposite to the second recessed area 512. In such examples, the third recessed area 716 receives the first lock 510 together with the second recessed area 512, which facilitates viewing of the first lock 510 by a user. In particular, the third recessed area 716 includes one or more grooves 718, 720 that align with the respective one or more grooves 710, 712 of the second recessed area 512. That is, in some examples, at least one of the grooves 710, 712 of the second recessed area 512 and at least one of the grooves 718, 720 of the third recessed area 716 are positioned on the same axis.

Figure 8:
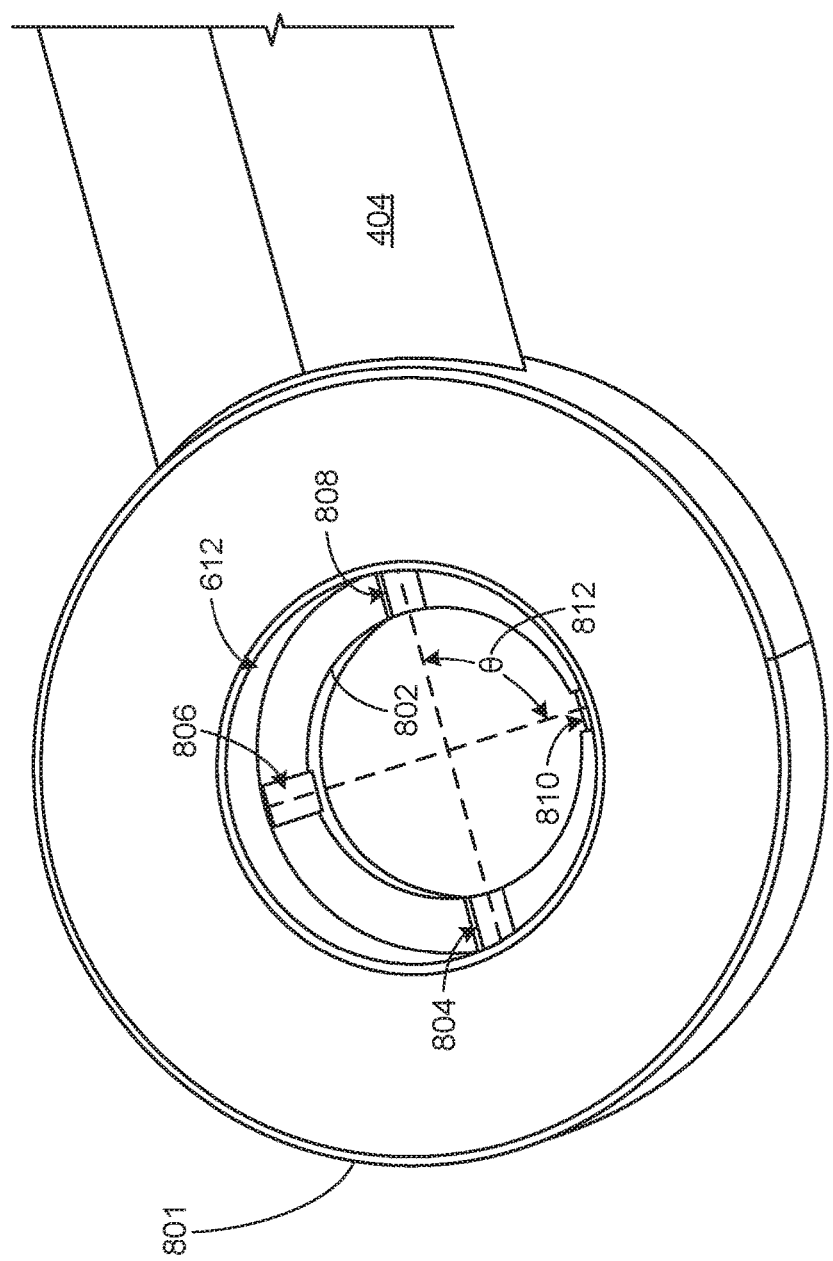

FIG. 8 is a detailed view of the second portion 404 of the mount 400 of FIG. 4 and shows an end 801 thereof. The end 801 of the second portion 404 at least partially forms the third joint 406 with the first portion 402. According to the illustrated example, the second portion 404 includes a first example annular protrusion or lip 802 disposed in the fourth aperture 612. In particular, the first lip 802 of the illustrated example receives and/or engages the aforementioned second lock 604, which can provide the locked state of the locking system 500.

To limit movement of and/or retain the second lock 604, the example first lip 802 includes one or more grooves 804, 806, 808, 810 to receive the one or more protrusions 614, 616, 618, 620, four of which are shown. In particular, the spring 606 urges at least one of the protrusions 614, 616, 618, 620 into at least one of the grooves 804, 806, 808, 810 when the protrusion(s) 614, 616, 618, 620 align therewith. In such examples, the second portion 404 of the second mount 400 is pivotably and/or rotatably locked with the pin 602 when at least one of the protrusions 614, 616, 618, 620 is positioned in at least one of the grooves 804, 806, 808, 810. Conversely, the second portion 404 pivotably and/or rotatably unlocks from the pin 602 when none of the protrusions 614, 616, 618, 620 are positioned in the grooves 804, 806, 808, 810.

According to the illustrated example, the grooves 804, 806, 808, 810 of the first lip 802 are positioned at one or more predefined angles corresponding to the one or more predefined positions of the locking system 500 and/or the first portion 402 relative to the second portion 404. In the example of FIG. 8, the example grooves 804, 806, 808, 810 are radially spaced from each other by an example angle 812, which is about 90 degrees in this example. In other examples, the angle 812 between adjacent grooves may be larger or smaller than 90 degrees. While the example of FIG. 8 depicts the example first lip 802 as having the four grooves 804, 806, 808, 810, in other examples, the first lip 802 may be implemented with fewer or one or more additional grooves to receive the second lock 604.

In some examples, to change the locking system 500 from the unlocked state to the locked state, the first portion 402 of the second mount 400 pivots and/or rotates relative to the second portion 404 until: (1) the first lock 510 aligns to at least one of the grooves 710, 712, 718, 720 associated with the first portion 402; and (2) at least one of the protrusions 614, 616, 618, 620 of the second lock 604 aligns with at least one of the grooves 804, 806, 808, 810 associated with the second portion 404. In such examples, the spring 606 simultaneously urges the first lock 510 to engage the first portion 402 and the second lock 604 to engage the second portion 404, thereby pivotably and/or rotatably locking the first portion 402 relative to the second portion 404. Thus, in some examples, a number of the grooves 804, 806, 808, 810 for second lock 604 and a number of the grooves 710, 712, 718, 720 are the same. Further, in such examples, the radial spacings between the grooves 804, 806, 808, 810 and the radial spacings the between the grooves 710, 712, 718, 720 are the same (e.g., the angles 714, 812 are substantially the same).

Figure 9:
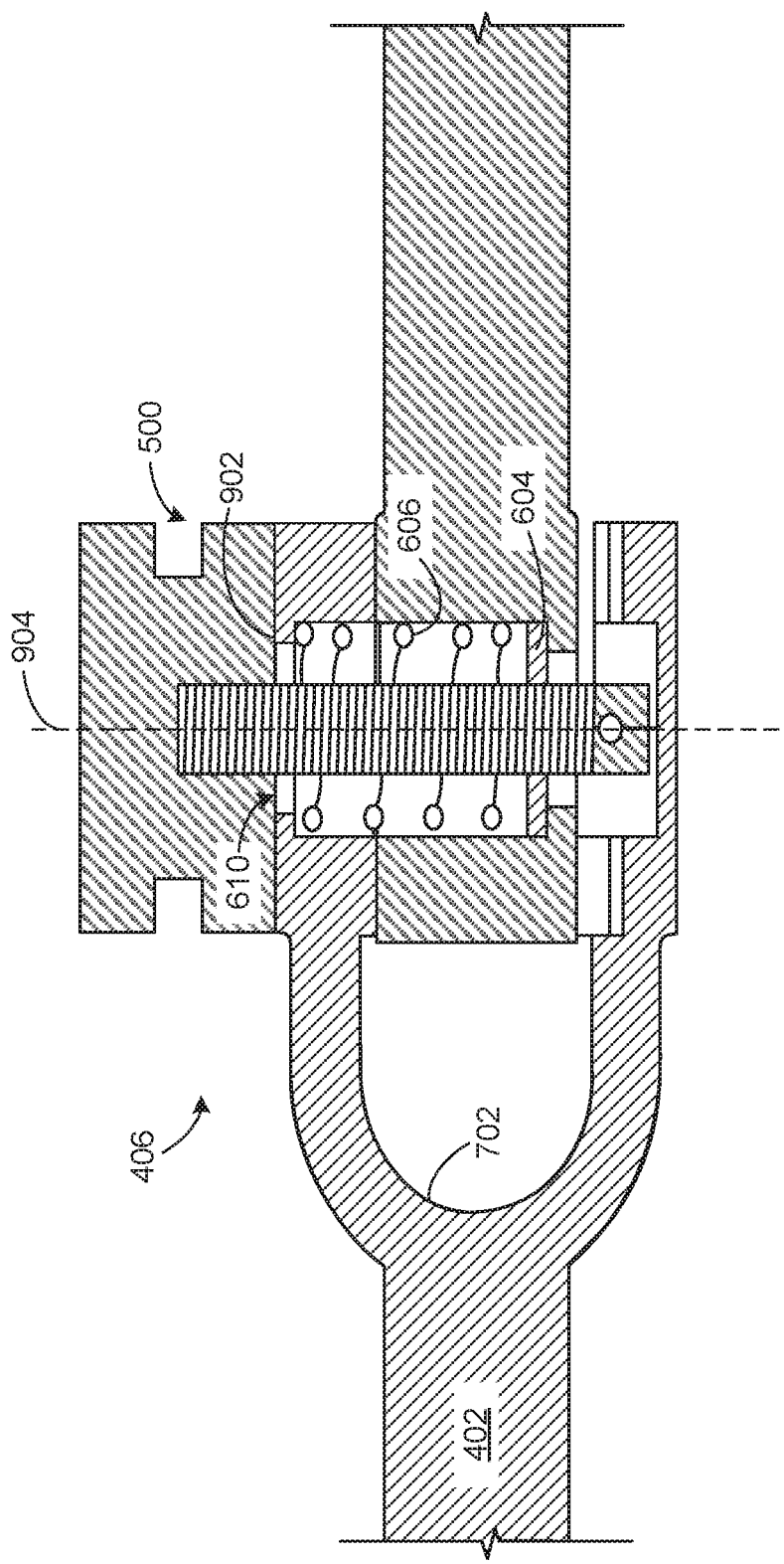
FIG. 9 is a cross-sectional portion-view of the example mount of FIG. 4.

FIG. 9 is a cross-sectional portion-view of the second example adjustable mount 400 of FIG. 4 and shows the example locking system 500 associated with the third example joint 406. As shown in FIG. 9, the spring 606 is interposed and/or compressed between the second lock 604 and the first portion 402 of the second mount 400 to impart a force on the second lock 604. In some examples, to retain the spring 606, the clevis 702 of the first portion 402 includes a second example annular protrusion or lip 902, which is shown in the example of FIG. 9. According to the illustrated example, the example second lip 902 at least partially extends radially inward relative to an axis 904 of the third aperture 610 to receive and/or retain the spring 606 therein.

Figure 10:
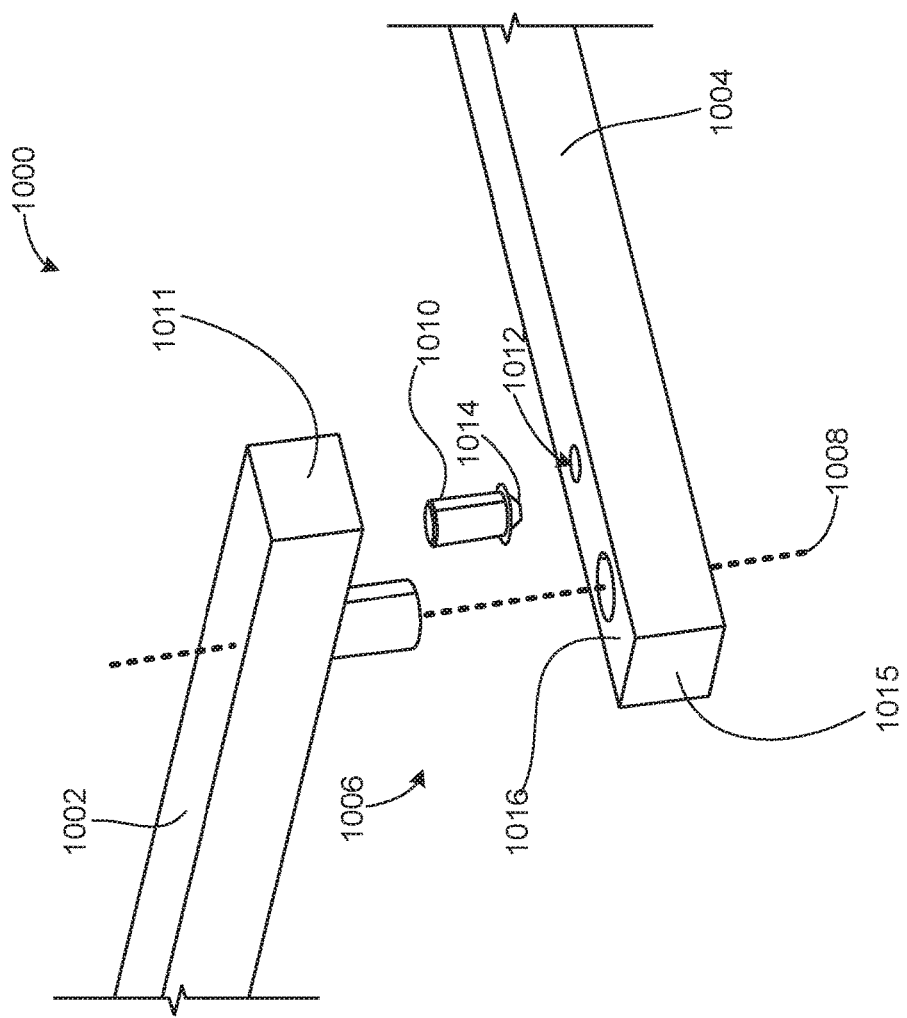
FIG. 10 is an exploded view of another example mount in accordance with examples disclosed herein.

FIG. 10 is an exploded view of a third example adjustable mount 1000 in accordance with examples disclosed herein. The third mount 1000 of the illustrated example may correspond to the first example mount 116 shown in FIGS. 1-3 and/or the second example mount 400 shown in FIGS. 4-9. In particular, the third mount 1000 includes a first portion 1002 pivotably and/or rotatably coupled to a second portion 1004 via a fifth example joint 1006. For example, the portions 1002, 1004 pivot and/or rotate relative to each other about an axis 1008. In some examples, the first portion 1002 of FIG. 10 is to receive the aforementioned second wheel assembly 110 and/or one or more other vehicle parts and/or vehicle accessories, and the second portion 1004 is to slidably couple to the aforementioned vehicle 100.

According to the illustrated examples, the third mount 1000 includes an example third lock (e.g., a spring plunger) 1010 to be operatively interposed between the first portion 1002 and the second portion 1004. In particular, similar to the example locking system 500, the third lock 1010 of FIG. 10 locks and/or unlocks the portions 1002, 1004 relative to each other (e.g., in one or more predefined positions). In the example of FIG. 10, the third lock 1010 is disposed on an end 1011 of the first portion 1002 offset relative to the axis 1008.

In some examples, the second portion 1004 of the third mount 1000 includes at least an aperture 1012 to receive a distal end 1014 the third lock 1010, one of which is shown. In such examples, the aperture 1012 is disposed on and/or adjacent an end 1015 of the second portion 1004 offset relative to the axis 1008. In particular, the end 1014 of the third lock 1010 is to extend into the aperture 1012 of the second portion 1004 when the lock 1010 and the aperture 1012 are aligned with each other, thereby locking the portions 1002, 1004 together.

While the example of FIG. 10 depicts the single aperture 1012 disposed on the second portion 1004, in other examples, the second portion 1004 may be implemented with one or more additional apertures to receive the third lock 1010. In such examples, an area 1016 of the second portion 1004 adjacent the aperture 1012 may be shaped, sized, and/or configured differently. In particular, the one or more additional apertures of the second portion 1004 are radially spaced on the second portion 1004 relative to the axis 1008 to provide multiple predefined positions in which the portions 1002, 1004 can be pivotably and/or rotatably locked together.

In some examples, to urge the third lock 1010 into the aperture 1012, the third lock 1010 includes a biasing element, such as a spring (e.g., a coil spring, one or more Belleville washers, etc.). To facilitate moving the third lock 1010 out of the aperture 1012, the end 1014 may be curved and/or tapered, as shown in FIG. 10. In such examples, in response to user input provided to the first portion 1002, the end 1014 of the third lock 1010 engages the second portion 1004 adjacent the aperture 1012, thereby urging the third lock 1010 out of the aperture 1012.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

From the foregoing, it will be appreciated that adjustable mount apparatus for use with vehicles and related methods have been disclosed that facilitate positioning and/or adjusting one or more vehicle parts and/or vehicle accessories associated with a vehicle. Some disclosed examples facilitate access to a gate of the vehicle. Some disclosed examples prevent the one or more vehicle parts and/or the vehicle accessories from interfering with the gate and/or damaging an exterior of the vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicle comprising:
a rear gate;
a side extending forward relative to the rear gate; and
a mount having a first portion and a second portion, the first portion to receive an object to be carried by the mount, the first portion pivotably coupled to the second portion and rotatable relative to the second portion between a first position and a second position, the second portion slidably coupled to the side of the vehicle and translatable along the side of the vehicle between a third position and a fourth position, the second portion adjacent the rear gate when in the third position and further away from the rear gate when in the fourth position.

2. The vehicle of claim 1, wherein the first portion is configured to lock in the first position or the second position.

3. The vehicle of claim 2, wherein the mount includes means for locking the first portion in the first position or the second position.

4. The vehicle of claim 3, wherein the means for locking includes a joint operatively interposed between the first portion and the second portion.

5. The vehicle of claim 4, wherein the means for locking changes between a locked state and an unlocked state based on user input provided to the joint.

6. The vehicle of claim 1, further including means for guiding movement of the second portion between the third position and the fourth position.

7. The vehicle of claim 6, wherein the means for guiding movement includes a track coupled to the side of the vehicle, the track configured to receive the second portion of the mount.

8. The vehicle of claim 7, wherein the means for guiding includes one or more rollers rotatably coupled to the second portion of the mount, the one or more rollers to move on the track.

9. The vehicle of claim 7, wherein the track is at least partially recessed relative to an exterior surface of the side of the vehicle.

10. A method for coupling a mount to a vehicle, the vehicle having a rear gate and a side extending forward relative to the rear gate, the method comprising:
pivotably coupling a first portion of the mount to a second portion of the mount, the first portion to receive an object to be carried by the mount, the first portion rotatable relative to the second portion between a first position and a second position; and
slidably coupling the second portion of the mount to the side of the vehicle, the second portion translatable along the side of the vehicle between a third position and a fourth position, the second portion adjacent the rear gate when in the third position and further away from the rear gate when in the fourth position.

11. The method of claim 10, wherein slidably coupling the second portion of the mount to the side of the vehicle includes positioning the second portion in a track for guiding movement of the second portion between the third position and the fourth position, the track to couple to the side of the vehicle.

12. The method of claim 11, further including rotatably coupling one or more rollers to the second portion of the mount, the one or more rollers to engage the track to facilitate movement of the second portion.

13. The method of claim 11, further including coupling the track to the side of the vehicle, wherein the track includes a first end positioned adjacent the rear gate of the vehicle and a second end positioned further away from the rear gate relative to the first end.

14. The method of claim 11, wherein the track includes at least a portion recessed relative to an exterior surface of the side of the vehicle.

15. An apparatus comprising:
a track configured to be fixedly coupled to a side of a vehicle, the side extending forward relative to a rear gate of the vehicle; and
a tire mount having a first portion and a second portion, the first portion configured to receive a tire to be carried by the tire mount, the first portion pivotably coupled to the second portion and rotatable relative to the second portion between a first position and a second position, the second portion slidably coupled to the track and translatable along the track between a third position and a fourth position, the second portion configured to be adjacent the rear gate when in the third position and further away from the rear gate when in the fourth position.

16. The apparatus of claim 15, wherein the track includes a first end configured to be positioned adjacent the rear gate and a second end configured to be positioned further away from the rear gate relative to the first end.

17. The apparatus of claim 15, further including one or more rollers rotatably coupled to the second portion of the mount, the one or more rollers to move along the track.

18. The apparatus of claim 15, wherein the track is configured to be at least partially recessed relative to an exterior surface of the side of the vehicle.

\* \* \* \* \*